(12) United States Patent  
Gaiser

(10) Patent No.: US 6,206,461 B1
(45) Date of Patent: Mar. 27, 2001

(54) BOTTOM STRUCTURE FOR A SELF-SUPPORTING FRAME BODY OF A MOTOR VEHICLE

(75) Inventor: Ferdinand Gaiser, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/345,745

(22) Filed: Jul. 1, 1999

(30) Foreign Application Priority Data

Jul. 1, 1998 (DE) .............................................. 198 29 432

(51) Int. Cl.$^7$ ............................. B60R 19/26; B60R 19/34
(52) U.S. Cl. ........................................ 296/204; 296/203.04
(58) Field of Search ............................. 296/195, 203.04, 296/204, 37.2, 188; 293/132, 133

(56) References Cited

U.S. PATENT DOCUMENTS

| 1,369,191 | * | 2/1921 | Ravelo | 296/37.2 |
| 1,540,945 | * | 6/1925 | Miller | 293/132 |
| 1,564,776 | * | 12/1925 | Green | 296/37.2 |
| 4,163,578 | * | 8/1979 | Watson | 296/204 |
| 4,557,519 | * | 12/1985 | Matsuura | 296/288 |
| 4,747,636 | | 5/1988 | Harasaki et al. | 296/186 |
| 4,840,424 | * | 6/1989 | Asoh | 296/204 |
| 5,195,780 | * | 3/1993 | Inoue et al. | 296/204 |
| 5,492,386 | * | 2/1996 | Callum | 296/64 |
| 5,507,522 | | 4/1996 | Ritchie | 280/800 |

FOREIGN PATENT DOCUMENTS

| 626345 | * | 2/1936 | (DE) | 296/204 |
| 1430401 | * | 1/1969 | (DE) | 296/310 |
| 1404293 | * | 5/1965 | (FR) | 296/204 |
| 1314470 | * | 4/1973 | (GB) | 296/204 |
| 336478 | * | 2/1936 | (IT) | 296/64 |
| 360008163 | * | 1/1985 | (JP) | 296/204 |
| 0182884 | * | 8/1991 | (JP) | 296/195 |
| 405050952 | * | 3/1993 | (JP) | 296/195 |
| 405085290 | * | 4/1993 | (JP) | 296/64 |

* cited by examiner

Primary Examiner—D. Glenn Dayoan
Assistant Examiner—Hilary Gutman
(74) Attorney, Agent, or Firm—Evenson, McKeown, Edwards & Lenahan, P.L.L.C.

(57) ABSTRACT

A bottom structure for a self-supporting motor vehicle frame body, especially a passenger automobile frame body, has two lateral beams extending into the rear. The beams are joined together in the rear area by at least two spaced-apart crossbeams. At least one central longitudinal strut reaches or extends between the crossbeams and is disposed parallel to the lateral beams with broadened thrusting surfaces and the ends of the strut resting against the crossbeams.

3 Claims, 2 Drawing Sheets

BOTTOM STRUCTURE FOR A SELF-SUPPORTING FRAME BODY OF A MOTOR VEHICLE

BACKGROUND OF THE INVENTION

This application claims the priority of German application 198 29 432.8, filed in Germany on Jul. 1, 1998, the disclosure of which is expressly incorporated by reference herein.

The present invention relates to a bottom structure for a self-supporting frame body of a motor vehicle, especially a passenger automobile, with two lateral beams extending into the rear end and joined together in the rear end area by at least two crossbeams spaced apart from one another lengthwise of the vehicle.

A bottom structure for a self-supporting motor vehicle frame body is generally known, especially for station wagons such as the Mercedes-Benz Model T. The station wagon has in the rear part of the frame a freight compartment which can be equipped with a third row of seats facing rearward. The feet of people riding on this third row of seats are placed in a corresponding recess in the floor of the freight compartment. In the event of a rear-end collision against the station wagon, considerable intrusions into the rear end might occur, which would also greatly deform the bottom structure. Especially in the event of a laterally off-center rear-end collision, deformations of the rear portion of the bottom structure occur, and this might result in considerable injury to persons on the third seat row, especially to their feet.

SUMMARY OF THE INVENTION

An object of the invention is present to solve the problem of creating a bottom structure which will offer improved safety for passengers in case of rear-end collision stresses.

This problem has been solved by providing at least one central longitudinal strut running between the two crossbeams and aligned parallel to the lateral beams. Even in the event of a laterally off-center rear-end collision, this central longitudinal strut, in addition to the affected lateral beam, absorbs and can propagate collision energy into the adjoining crossbeam which in turn passes the absorbed energy on also to the second lateral beam. By distributing the collision stresses in spite of the rear-end off-center collision that initially impacts only one lateral beam, the rear-end intrusions into the bottom structure are reduced. Especially in the case of station wagons, the result is a reduced deformation of the freight compartment which, in the case of the presence of a third seat row, preserves an adequate foot well.

In one embodiment of the present invention, the central longitudinal strut is provided at its extremities with broadened thrusting surfaces which rest broadly against the two crossbeams. In this manner the transfer of impact energy in case of a rear-end collision to the forwardly adjoining crossbeam is further improved.

In a further embodiment of the present invention, the central longitudinal strut is disposed releasably on at least one crossbeam and on at least one of the two crossbeams it is journaled so as to pivot upwardly about a horizontal axis running transversely of the vehicle. Thus, accessibility to a chamber situated beneath the central longitudinal strut can be maintained, especially a chamber for a spare wheel or for other freight. Advantageously, the central longitudinal strut can also be configured so that it serves as a lever arm for lifting and extracting the spare wheel from its storage space, i.e., from the spare wheel recess. For this purpose the central longitudinal strut can engage the spare wheel with corresponding holders. Also, a handle can be associated with the central longitudinal strut to permit simplified raising of the central longitudinal strut.

In a further embodiment of the invention, the central longitudinal strut, as seen in the direction of the vehicle's length, is positioned at a slight distance away from at least one crossbeam. If the central longitudinal strut is positioned at a slight distance from both crossbeams, the central longitudinal strut is advantageously affixed to a floor plate and is disposed at the same level as the two longitudinal beams. An especially advantageous arrangement is achieved if the central longitudinal strut is positioned at a slight distance only from the rear-end crossbeam, because the remaining gap then permits the elastic flexing of the rear-end crossbeam in bumper tests without striking the central longitudinal strut.

In a yet further embodiment of the invention, the central longitudinal strut is configured in combination with the arrangement of a third seat row in a station wagon as an add-on part that can be fastened between crossbeams. Thus the central longitudinal strut can be added on to passenger cars if necessary, without changing the frame structure and the bottom structure along therewith. The bottom structure and the accompanying frame structure thus remain the same, and only when a third row of seats is ordered by the customer is the central longitudinal strut also included.

Other objects, advantages and novel features of the present invention will become apparent from the following detailed description of the invention when considered in conjunction with the accompanying drawings.

DETAILED DESCRIPTION OF THE DRAWINGS

Figure 1:
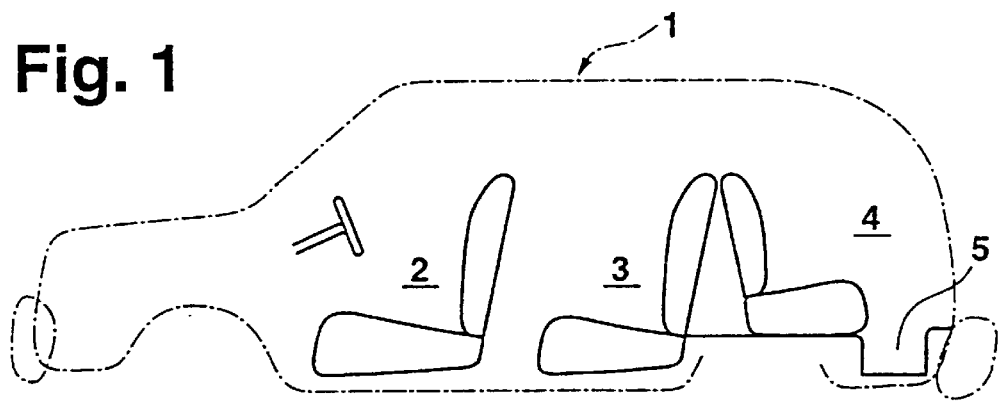
FIG. 1 is a schematic side view of a station wagon with a third row of seats, which is provided with an embodiment of a bottom structure according to the invention.

A station wagon 1 has, in a known manner (see, e.g., the Mercedes-Benz Model T) a self-supporting frame body which has a passenger compartment comprising a front seat area 2 and a rear seat area 3. The passenger compartment extends to the rear end of the station wagon 1 and into a freight compartment 4 in which a third seat row can be positioned facing the rear. Persons on the third seat row put their legs into a recess in the floor of the freight compartment. The recess forms a foot well.

The bottom structure of the self-supporting frame body of the station wagon 1 has in a known manner a frame area. The bottom structure has at the level of the passenger compartment side lateral sills, beams and crossbeams which are welded together to form a rigid frame. A rear area of the bottom structure shown in FIGS. 2 to 4, which is integrally joined to the rest of the bottom structure of the station wagon, begins under the rear seat area 3. This rear-end area has two side beams 6 which are arched at the rear axle, not shown, in a known manner. The side beams 6 extend forward into a sill area and merge with the longitudinal beam 5 of the passenger compartment. Underneath the front seat area 2 a first, front crossbeam 7 extends between the two side beams 6 and is referred to hereinafter as the front seat crossbeam 7. Underneath the rear seat area 3, in the area of the arch of the side beam 6, additional crossbeam 8 is provided called the rear seat crossbeam 8. Above a rear axle (not shown) is a third crossbeam 9 which is to be called the rear axle crossbeam 9. The rear end of the side beam 6 is formed by a crossbeam 10 configured as a bumper mount. A bumper 11 is associated with the crossbeam 10 in a known manner.

In the event of off-center rear-end collision stresses which are simulated by a barrier B, to prevent the impact from producing a great deformation of the rear-end area of the bottom structure and hence a great reduction of the length of the freight compartment 4, an additional support is provided in the middle of the vehicle between the two side beams 6. The additional support is in the form of a central longitudinal strut 12 which extends parallel to the side beams 6 and contacts at one end the rear crossbeam 9 and at the other end the crossbeam 10. For this purpose the central longitudinal strut 12 has a smoothly flaring end portion 13 which is in surface contact with a corresponding back surface of the rear axle crossbeam 9. Furthermore, the central longitudinal strut 12 has a rear end area 14 broadened in a stepped manner, which is in surface contact with a corresponding surface on the crossbeam 10. As it can be seen especially in FIG. 3, the central longitudinal strut 12 is at the same level as the rear axle crossbeam 9 and crossbeam 10.

Figure 4:
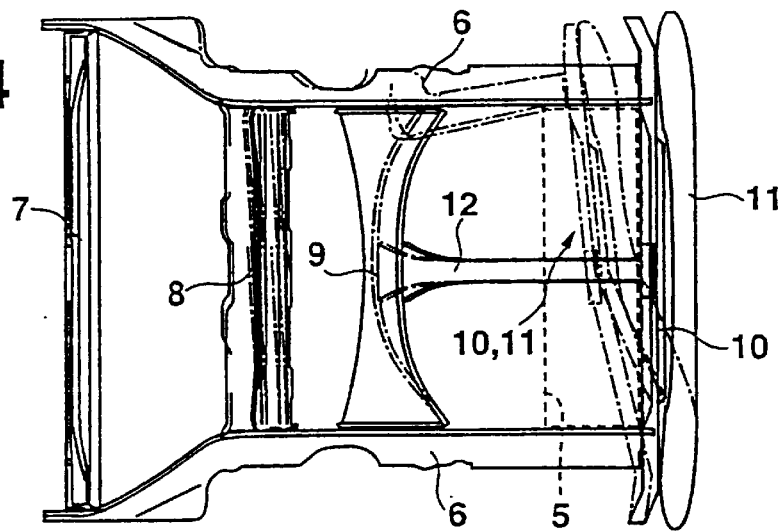
FIG. 4 is a plan view of the rear-end area of the bottom structure of FIGS. 2 and 3 is in a deformed (dot-dash lines) and undeformed (solid lines) state.

In the case of off-center rear-end collision stresses, which are simulated by the barrier B, the additional stiffening of the rear-end area of the bottom structure by way of the central longitudinal strut 12 results in reduced rear-end intrusions in comparison with bottom structures without a central longitudinal strut. FIG. 4 shows, on the one hand the undeformed initial state of the bumper 11 (solid lines), and on the other hand, the rear-end area of the bottom structure deformed by the barrier B (dot-dash lines). The foot well 5 is shown in dashed lines as it is positioned in the undeformed state relative to the rear-end area. FIG. 4 shows that the foot well 5 is partially preserved, which is not the case in a rear-end collision without additional stiffening by the central longitudinal strut 12. The danger of injury to persons in the third row of seats is thus reduced by the central longitudinal strut.

Figure 2:
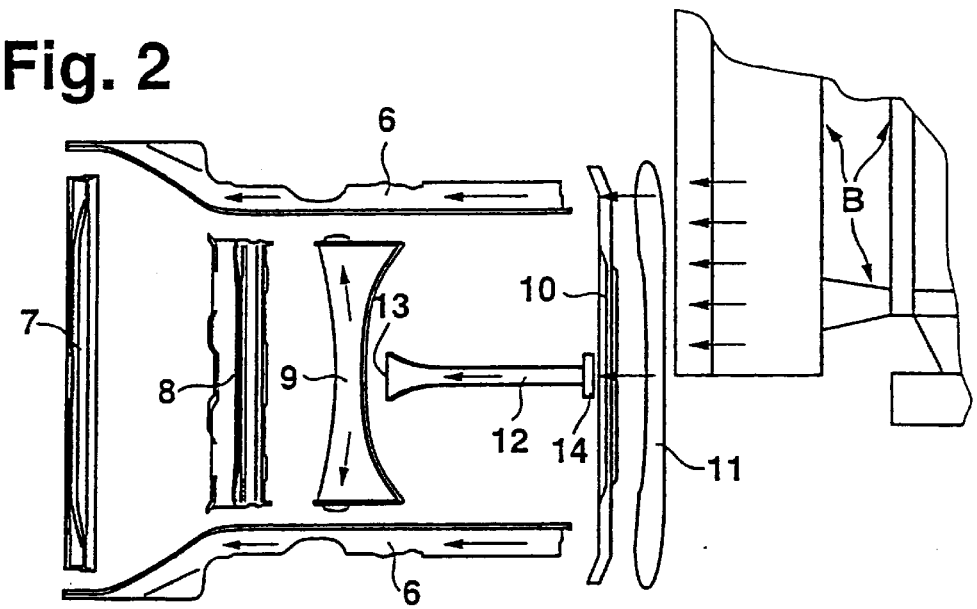
FIG. 2 is an exploded plan view of the rear-end area of an embodiment of a bottom structure according to the invention for a station wagon according to FIG. 1.
Figure 3:
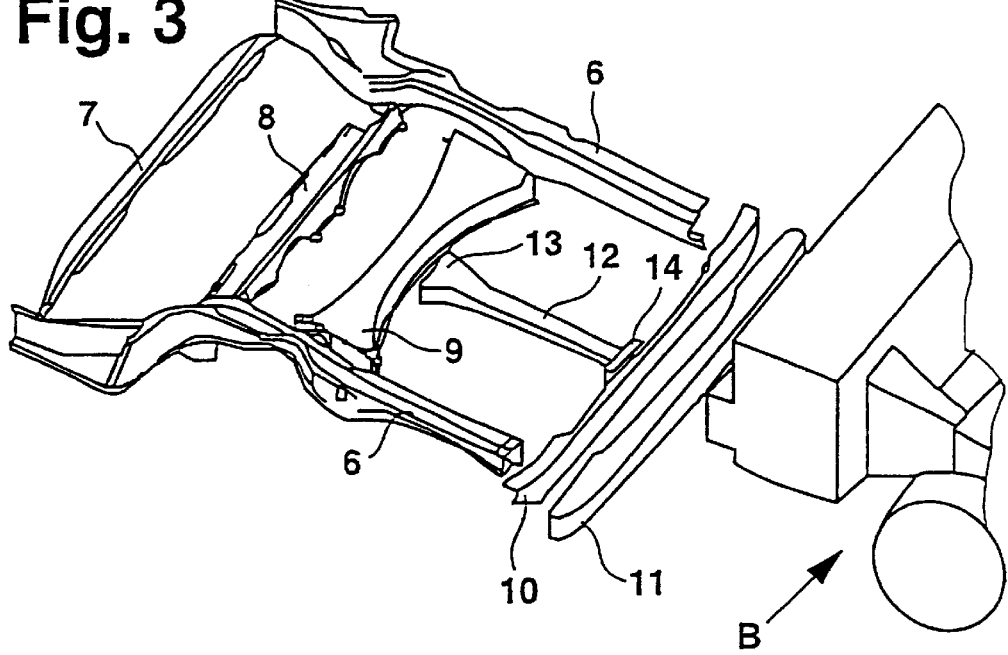
FIG. 3 is an exploded perspective view of the rear-end area of the bottom structure of FIG. 2.
Figure 5:
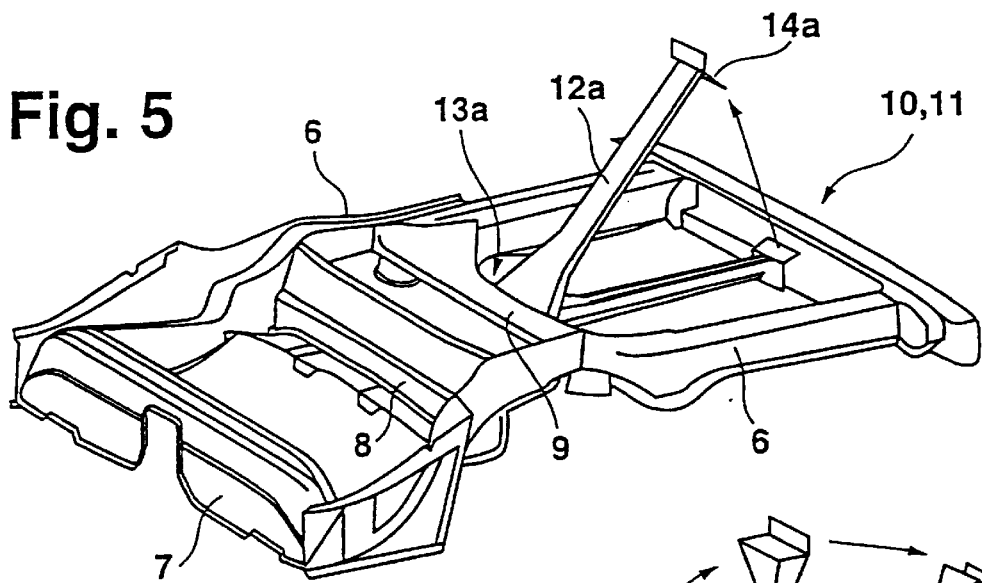
FIG. 5 is a perspective view of another rear-end area of a bottom structure similar to FIGS. 2 to 4.
Figure 6:
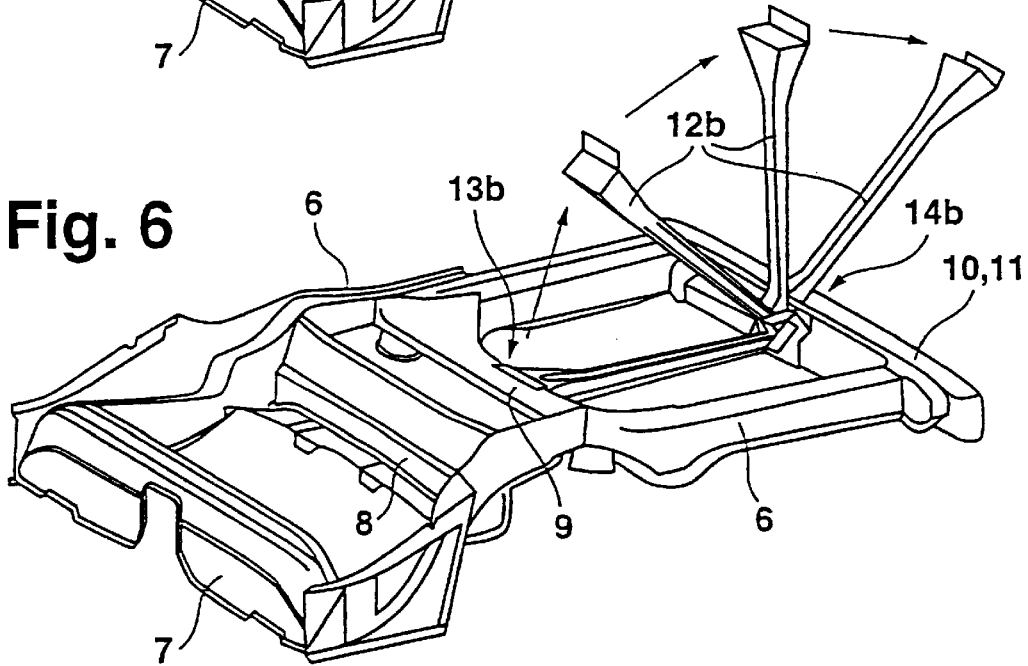
FIG. 6 is a perspective view of another rear-end area of a bottom structure similar to FIG. 5.

The rear-end areas of the bottom structures according to FIGS. 5 and 6 correspond substantially to the bottom structure previously described with the aid of FIGS. 2 to 4, the same reference numbers having been used for identical components. The only difference is that, in the bottom structures according to FIGS. 5 and 6, the central longitudinal struts 12a and 12b are each releasable and able to turn on the rear axle crossbeam 9 and crossbeam 10, respectively.

In the embodiment in FIG. 5, the central longitudinal strut 12a is releasably disposed on the crossbeam 10 at its rearward end area 14a, and also positioned at its front end 13a for pivoting on a hinge system on the rear axle crossbeam 9. Thus, the central longitudinal strut can be raised in the direction of the arrow and thus be rotated about its connection to the rear axle crossbeam 9.

In the embodiment according to FIG. 6, the central longitudinal strut 12b is disposed for turning in the reverse direction. The central longitudinal strut 12b is releasably attached by its front end 13b to the rear axle crossbeam 9. The rear end 14b of the central longitudinal strut 12b is hinged on crossbeam 10 such that the central longitudinal strut 12b can turn in the direction of the arrow as shown in FIG. 6 to a point above the bumper 11. This is advantageous especially in case a spare wheel must be lifted out of the freight compartment with the central longitudinal strut 12b, because the central longitudinal strut 12b can serve as a lifting aid. Depending on whether the spare wheel is under or above the central longitudinal strut 12b, appropriate holders for the spare wheel are associated with the central longitudinal strut 12b and a simultaneous lifting and turning of the spare wheel by a swinging movement of the central longitudinal strut 12b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bottom structure for a self-supporting frame of a vehicle, comprising side beams reaching into a rear-end area and being connected to one another by at least two crossbeams spaced apart in a longitudinal direction of the vehicle, wherein at least one central longitudinal strut extends between the at least two crossbeams and is parallel to the side beams, wherein the at least one central longitudinal strut is disposed releasably at at least one of the at least two crossbeams and is hinged to rotate about a horizontal axis running transversely of the vehicle for upward movement.

2. The bottom structure according to claim 1, wherein the at least one central longitudinal strut has extremities provided with broadened thrusting surfaces configured to rest broadly against the at least two crossbeams.

3. The bottom structure according to claim 1, wherein the at least one central longitudinal strut, in a lengthwise direction of the vehicle, is positioned at a slight distance from at least one of the at least two crossbeams prior to a collision.

* * * * *